US011125379B2

(12) United States Patent
Thomas et al.

(10) Patent No.: US 11,125,379 B2
(45) Date of Patent: Sep. 21, 2021

(54) FOLDABLE MOUNTING BRACKET FOR PATIO AND DECK ACCESSORIES

(71) Applicants: Lawrence John Thomas, Leesburg, VA (US); Mary Catherine Thomas, Leesburg, VA (US)

(72) Inventors: Lawrence John Thomas, Leesburg, VA (US); Mary Catherine Thomas, Leesburg, VA (US)

( * ) Notice: Subject to any disclaimer, the term of this patent is extended or adjusted under 35 U.S.C. 154(b) by 0 days.

(21) Appl. No.: 16/018,262

(22) Filed: Jun. 26, 2018

(65) Prior Publication Data

US 2018/0347747 A1 Dec. 6, 2018

Related U.S. Application Data

(63) Continuation-in-part of application No. 15/461,355, filed on Mar. 16, 2017, now Pat. No. 10,006,585.

(60) Provisional application No. 62/311,564, filed on Mar. 22, 2016.

(51) Int. Cl.
*F16M 13/02* (2006.01)
*A47G 7/04* (2006.01)
*F16M 11/04* (2006.01)
*E04H 12/22* (2006.01)
(Continued)

(52) U.S. Cl.
CPC ............ *F16M 13/02* (2013.01); *A47G 7/041* (2013.01); *E04H 12/22* (2013.01); *F16M 11/04* (2013.01); *A45B 2023/0012* (2013.01); *A47B 5/04* (2013.01)

(58) Field of Classification Search
CPC ........ F16M 13/02; F16M 11/04; A47G 7/041; E04H 12/22; A45B 2023/0012; A47B 5/04
USPC .......... 248/685, 110, 111, 113, 218.4, 219.1, 248/518, 534, 535, 536, 539, 540, 541, 248/311.2; 224/414
See application file for complete search history.

(56) References Cited

U.S. PATENT DOCUMENTS

719,268 A * 1/1903 Slyder .................. H01Q 1/1221
248/534
1,314,981 A * 9/1919 Ragland ................ A47L 13/512
248/113
(Continued)

*Primary Examiner* — Christopher Garft
*Assistant Examiner* — Michael McDuffie (57) ABSTRACT

A unique foldable mounting bracket assembly for mounting and securing both vertically and horizontally disposed accessories for decks and patios. Both an upper and lower mounting bracket assembly are required when supporting a vertically disposed cylindrical post. These brackets are mounted to the vertical post and when used in conjunction with the railing of a deck the brackets can be mounted below the top railing horizontal support cross member and above the lower support cross member. When mounting in conjunction with a horizontally disposed accessory, only a single bracket is required; which can be mounted below the top railing horizontal support cross member. The bracket can be mounted such that the horizontally disposed accessory can be stored and not be removed. The mounting bracket assembly can support both vertically and horizontally disposed patio and deck accessories simultaneously. This unique foldable mounting bracket when not in use stows flush against the vertical support post not protruding out of the envelope of the standard 2"×4" railing horizontal members.

2 Claims, 10 Drawing Sheets

(51) Int. Cl.
*A47B 5/04* (2006.01)
*A45B 23/00* (2006.01)

(56) References Cited

U.S. PATENT DOCUMENTS

| | | | | |
|---|---|---|---|---|
| 1,329,394 | A * | 2/1920 | Fry | A47L 13/512 248/113 |
| 2,686,029 | A * | 8/1954 | Raymond | E04H 12/32 248/201 |
| 4,063,701 | A * | 12/1977 | Wray | A47C 7/62 248/292.14 |
| 4,936,594 | A * | 6/1990 | Oliver, III | A47C 7/66 280/47.19 |
| 5,829,726 | A * | 11/1998 | Withun | B60N 3/102 248/311.2 |
| 6,003,826 | A * | 12/1999 | Galloway, III | F16M 13/02 248/519 |
| 6,062,519 | A * | 5/2000 | Baldassarre | E04F 11/18 248/311.2 |
| 6,227,509 | B1 * | 5/2001 | Plocher | B60N 3/102 248/128 |
| 6,702,245 | B1 * | 3/2004 | Otterman | E04H 12/2276 248/214 |
| 6,715,726 | B1 * | 4/2004 | Dybalski | B60N 3/102 224/926 |
| 7,334,593 | B2 * | 2/2008 | Avery | A45B 1/00 108/50.12 |
| 8,573,553 | B2 * | 11/2013 | Stephan | B60N 3/102 211/71.01 |
| 8,950,723 | B1 * | 2/2015 | Fogelstrom | A45B 11/00 135/16 |
| 10,006,585 | B2 * | 6/2018 | Thomas | E04H 12/22 |
| 2002/0096616 | A1 * | 7/2002 | Ratcliff | A45F 5/00 248/539 |
| 2003/0099468 | A1 * | 5/2003 | Kerec | H05B 3/008 392/430 |
| 2005/0035254 | A1 * | 2/2005 | Moyer | B60N 3/102 248/311.2 |
| 2007/0034758 | A1 * | 2/2007 | Bates | E04H 12/2276 248/218.4 |
| 2007/0108364 | A1 * | 5/2007 | Metheny | A45B 11/00 248/541 |
| 2007/0170331 | A1 * | 7/2007 | Prater | A47G 23/0225 248/311.2 |
| 2009/0000523 | A1 * | 1/2009 | Ciardelli | A47B 37/04 108/42 |
| 2009/0206098 | A1 * | 8/2009 | Garahan | B60N 3/102 220/737 |
| 2011/0036278 | A1 * | 2/2011 | Karl | A47B 57/545 108/147.13 |
| 2012/0168598 | A1 * | 7/2012 | Walker | B60R 7/12 248/539 |
| 2013/0092808 | A1 * | 4/2013 | Adachi | B60N 3/102 248/311.2 |
| 2018/0023757 | A1 * | 1/2018 | Baiera | F16M 13/02 |
| 2019/0307253 | A1 * | 10/2019 | Pendleton, Jr. | A47C 7/624 |

* cited by examiner

FOLDABLE MOUNTING BRACKET FOR PATIO AND DECK ACCESSORIES

CROSS-REFERENCE TO RELATED APPLICATIONS

This patent claims the benefits under 35 U.S.C. § 119(e) of prior U.S. Provisional Application No. 62/311,564 filed Mar. 22, 2016, Non-Provisional application Ser. No. 15/461,355 and U.S. Pat. No. 10,006,585 B2

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

1) Field of Invention

This invention relates to a foldable mounting bracket assembly which can be used to secure and support both vertically and horizontally disposed deck and patio accessories. The foldable mounting bracket assembly mounts to a vertically disposed post that supports the deck railing or the like. The vertically disposed deck and patio accessories that can utilize the invention are: umbrellas, flag poles, privacy screens and other items that are attached or utilize a vertical cylindrical disposed support member having a compatible diameter to the vertical cylindrical aperture or through the use of a semi cylindrical tapered wedge. The horizontally disposed deck and patio accessories that can utilize the invention are: tables, plant holders, and other items. The aforementioned horizontally disposed deck and patio accessories can be secured to the foldable mounting bracket assembly with a securing pin. One of the unique features of the invention is that when the foldable mounting bracket assembly is not in use, unlike other brackets, this foldable mounting bracket assembly can be positioned flush against the deck railing vertical support post or the like to which the bracket is mounted.

2) Description of the Related Art

There are many types of bracket assemblies that can support various vertically and horizontally disposed deck or patio accessories. All the current and previous support brackets, when installed, remain in the operational position to either the horizontal railing support or the vertical support post. However the prior art does not fold and limits the support apparatus to remain perpendicular to the mounting surface possibly protruding beyond the envelope of the deck railings. For example see U.S. Pat. Nos. 8,950,723B1, and 6,003,826. It is the applicants' belief that while these brackets can support various vertically disposed accessories, these brackets cannot support horizontally disposed accessories, like a table, and these brackets remain perpendicular to their mounting surface and do not fold flat against the mounting surface.

BRIEF SUMMARY OF THE INVENTION

This invention relates to a foldable mounting bracket assembly which can be used to secure and support both vertically and horizontally disposed deck and patio accessories. The foldable mounting bracket assembly when supporting vertically disposed deck or patio accessories requires two foldable mounting bracket assemblies mounted to the vertical deck railing support post; one foldable mounting bracket assembly mounted below the upper horizontal railing support member and the second foldable mounting bracket assembly mounted above the lower horizontal railing support member. A horizontally disposed deck and patio accessory, requires only one foldable mounting bracket assembly mounted to the vertical deck railing support post below the upper horizontal railing support member. The horizontally disposed deck or patio accessory is installed with a securing pin. The foldable mounting bracket assembly when supporting both vertically and horizontally disposed accessories requires two foldable mounting bracket assemblies mounted to the vertical deck railing support post; one foldable mounting bracket assembly mounted below the upper horizontal railing support member and the second foldable mounting bracket assembly mounted above the lower horizontal railing support member. A semi cylindrical tapered wedge may be used with the foldable mounting bracket assembly to accommodate various diameters of the vertically disposed accessory, the umbrella, and/or to fasten the horizontally disposed accessory, the table.

DETAILED DESCRIPTION OF THE INVENTION

Figure 1:
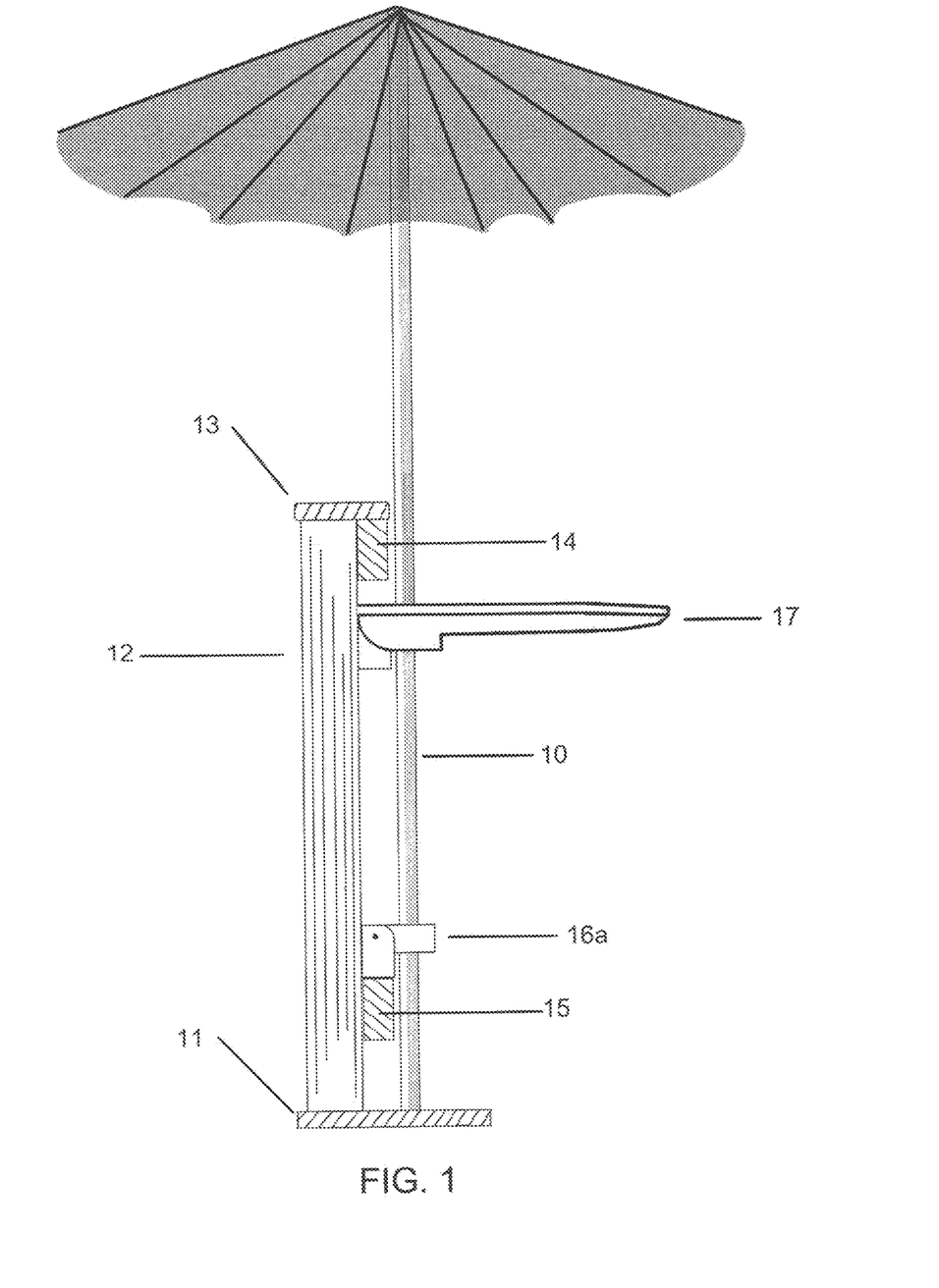
FIG. 1 is a side elevation illustrating the invention deployed in the operational position supporting both a vertically disposed cylindrical support member of an accessory and a horizontally disposed accessory.
Figure 2:
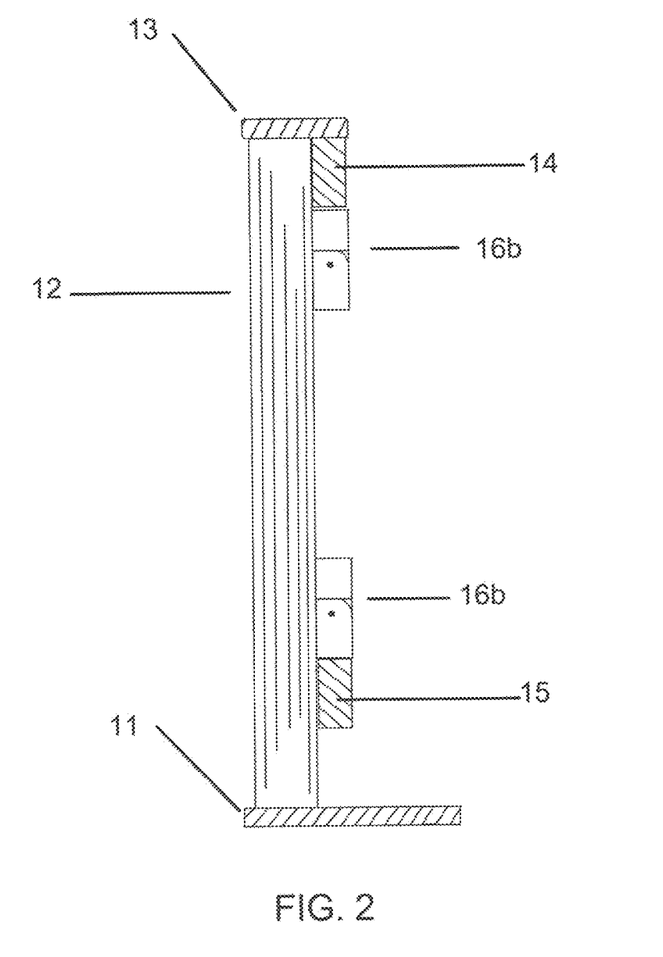
FIG. 2 is a side elevation illustrating the invention in the closed position maintaining and not protruding outside the envelope of the standard 2"×4" horizontal railing.
Figure 3:
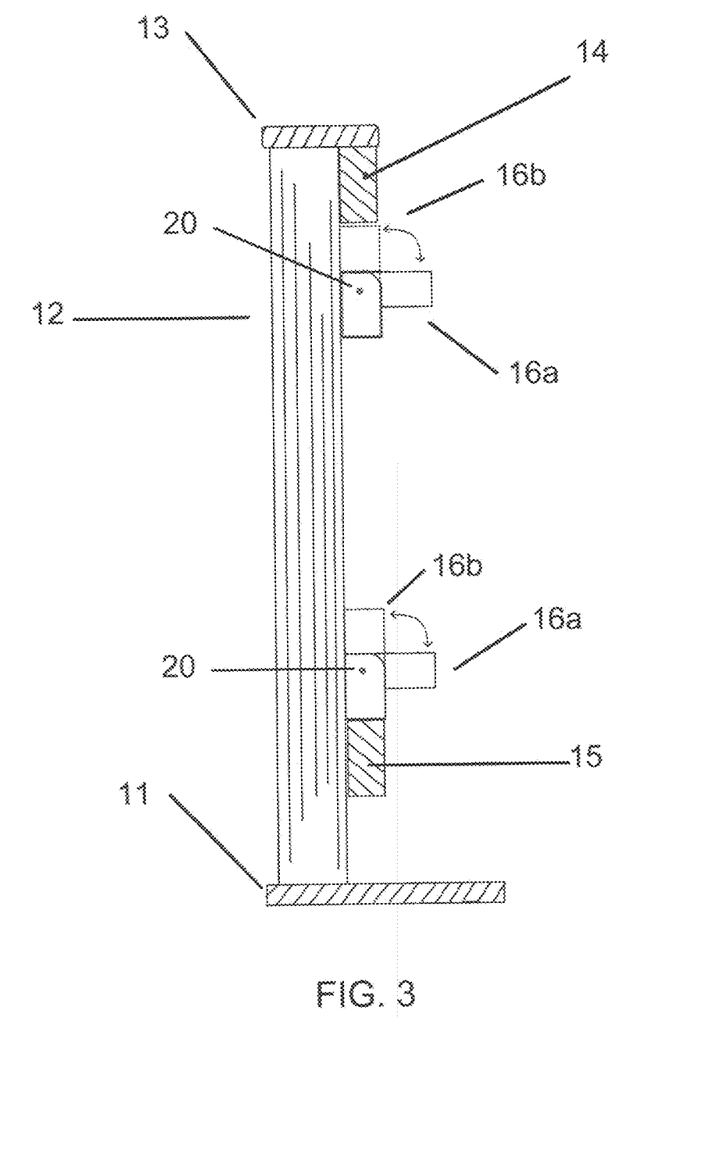
FIG. 3 is a side elevation illustrating the folding mounting bracket assembly exhibiting the pivot axis the invention mounted on the deck railing vertical support post.
Figure 4:
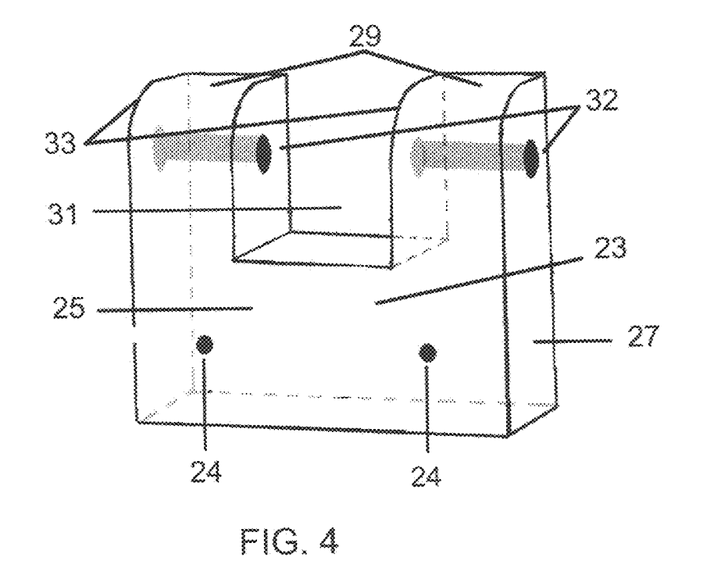
FIG. 4 is an isometric view of the front side of the base portion of the foldable mounting bracket assembly.
Figure 5:
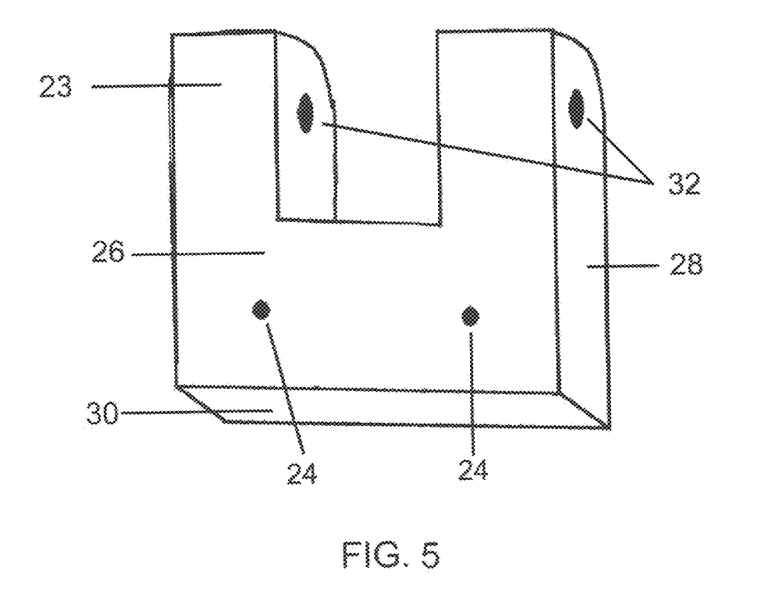
FIG. 5 is an isometric view of the back side of the base portion of the foldable mounting bracket assembly.
Figure 6:
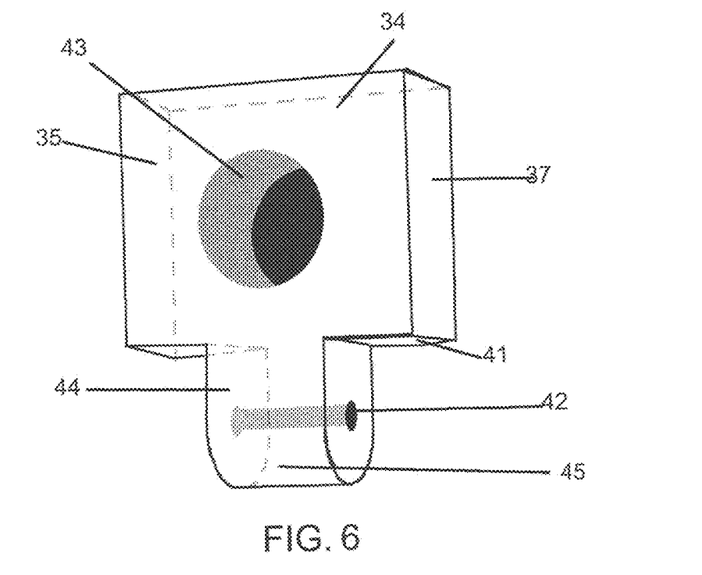
FIG. 6 is an isometric view of the front side of the rotating mount head of the foldable mounting bracket assembly.
Figure 7:
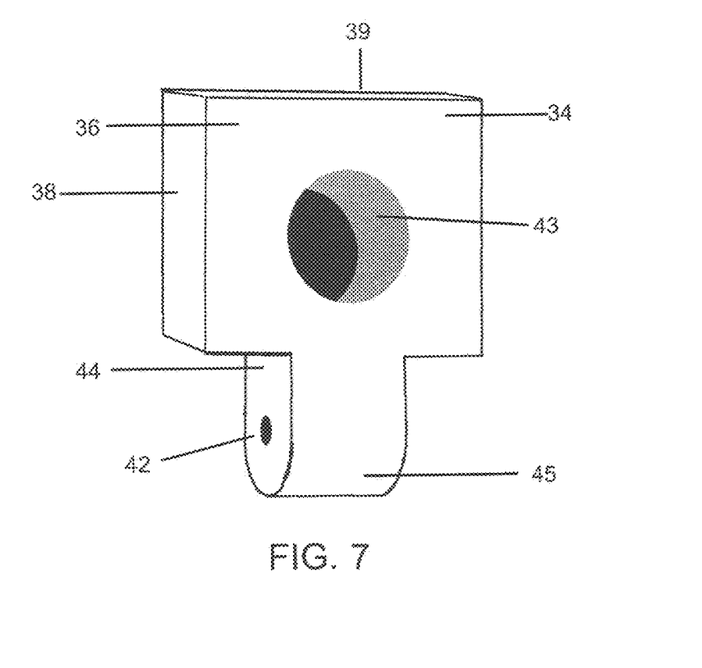
FIG. 7 is an isometric view of the back side of the rotating mount head of the foldable mounting bracket assembly.
Figure 8:
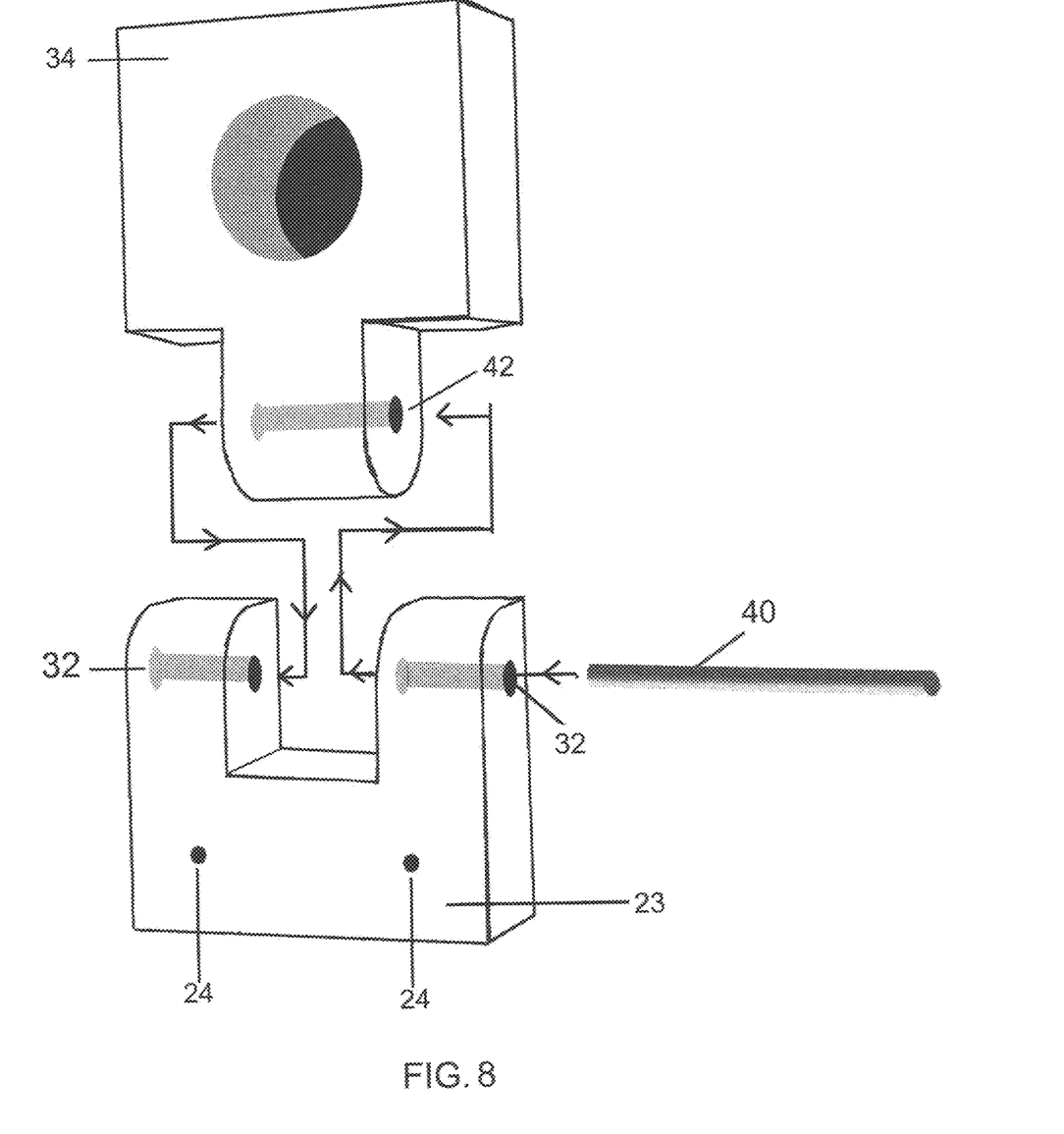
FIG. 8 is an exploded view of the foldable mounting bracket assembly.
Figure 9:
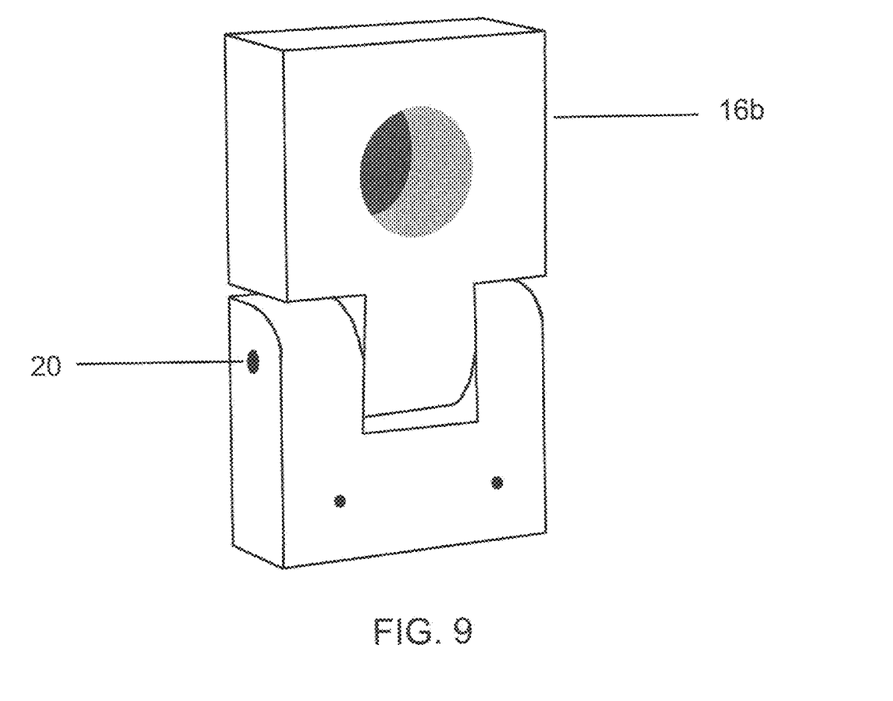
FIG. 9 is an isometric view of the foldable mounting bracket assembly in the closed position.
Figure 10:
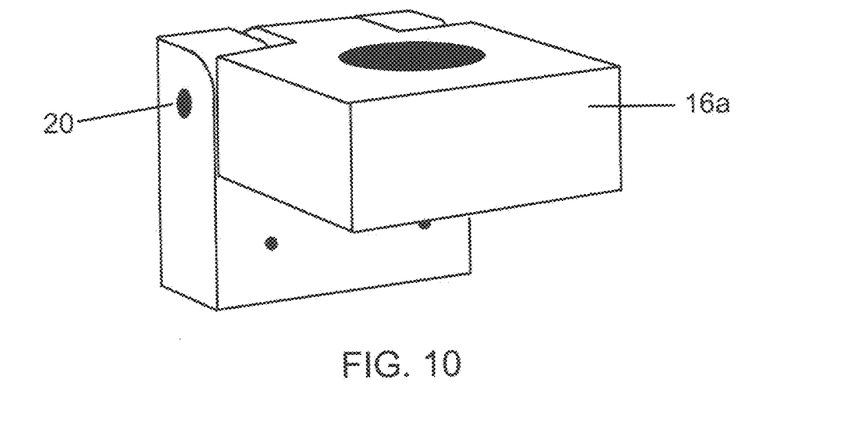
FIG. 10 is an isometric view of the foldable mounting bracket assembly in the deployed position.
Figure 11:
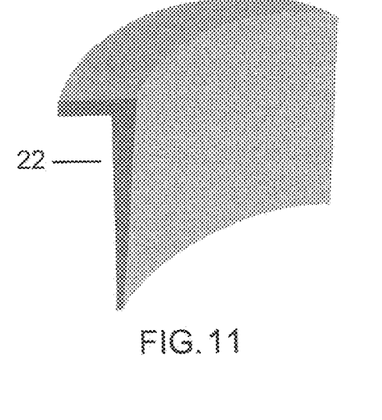
FIG. 11 is an isometric view of the semi cylindrical tapered wedge.
Figure 12:
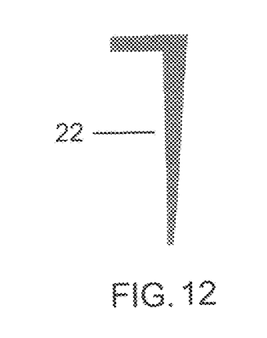
FIG. 12 is a side elevation of the semi cylindrical tapered wedge.
Figure 13:
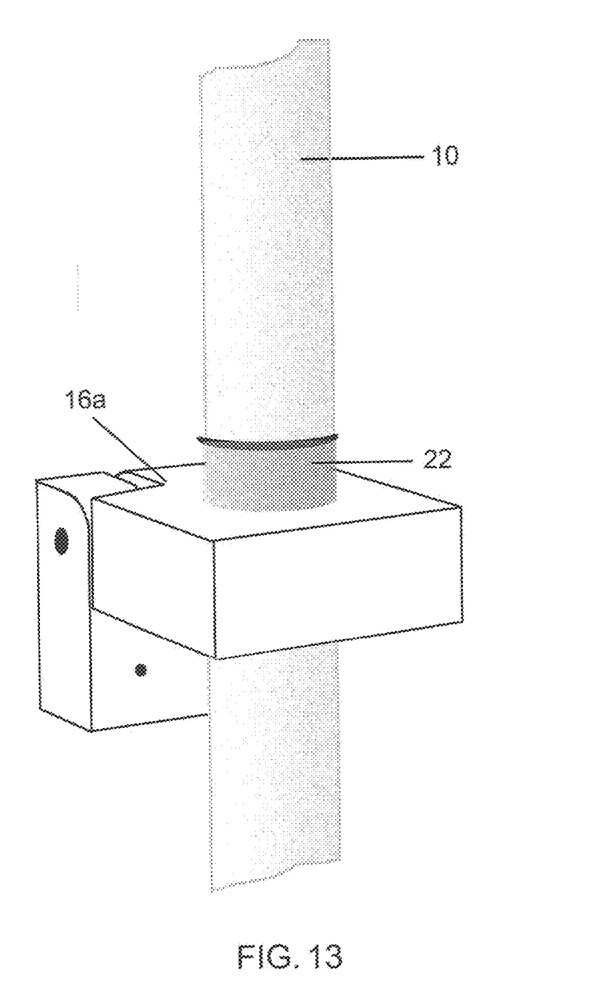
FIG. 13 is an isometric view of a vertically disposed cylindrical support member utilizing the semi cylindrical tapered wedge.
Figure 14:
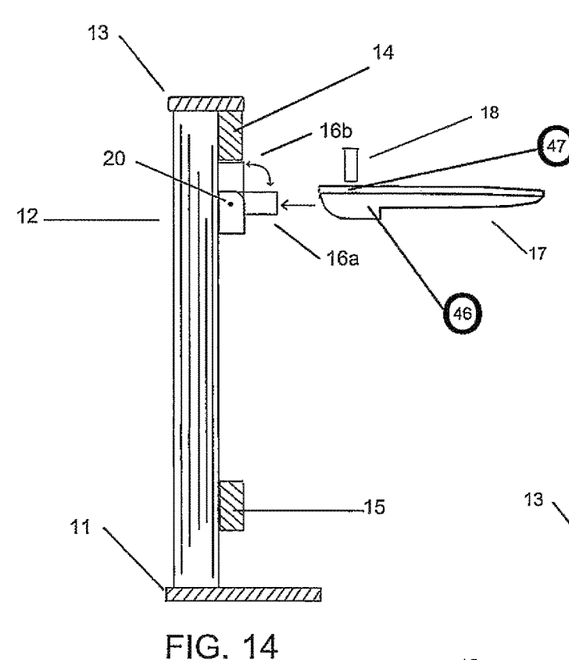
FIG. 14 is a side elevation illustrating the installation of a horizontally disposed accessory, a table, using a securing pin.
Figure 15:
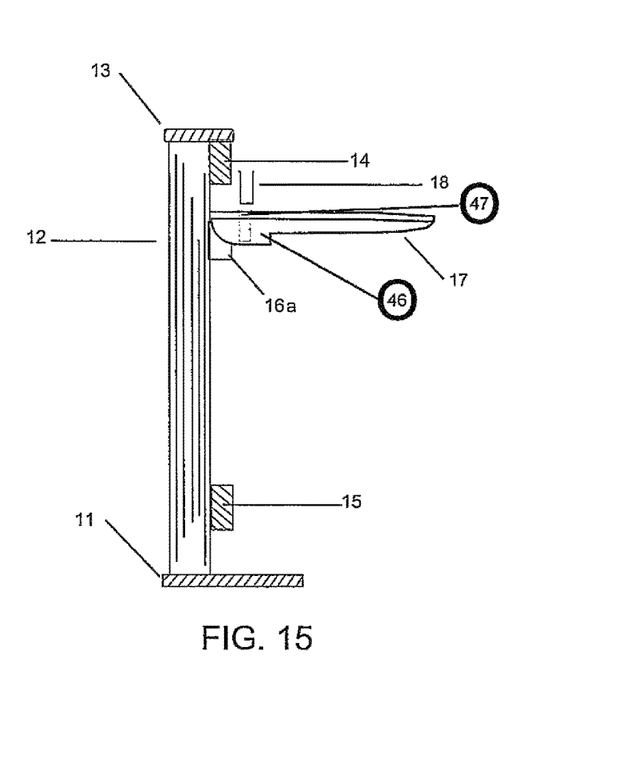
FIG. 15 is a side elevation illustrating the invention supporting a horizontally disposed accessory, a table, in the operational position.
Figure 16:
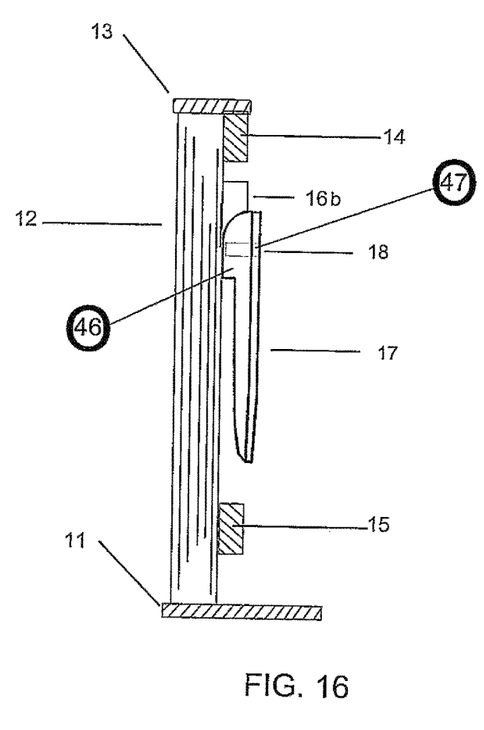
FIG. 16 is a side elevation illustrating a permanently mounted horizontally disposed accessory, a table, stowed parallel to the vertical railing support post.
Figure 17:
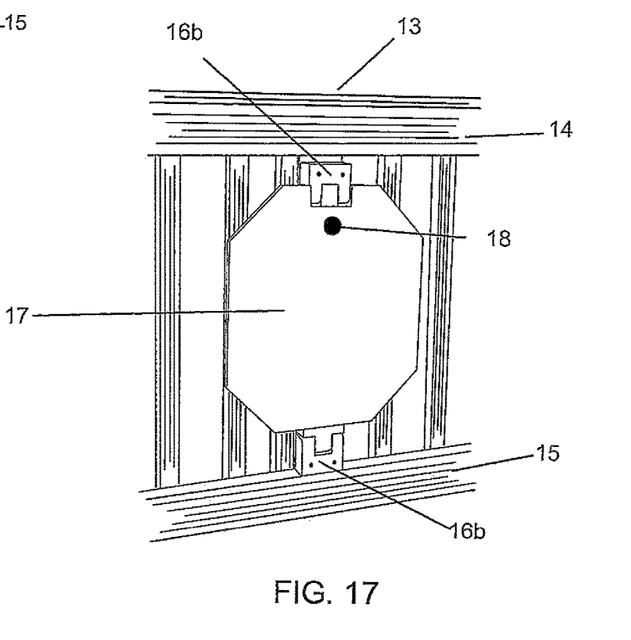
FIG. 17 is a front plan view showing a permanently mounted horizontally disposed accessory, a table, stowed parallel against the deck railing vertical support post.

The following FIGS. describe the invention with numerical references. Numerical references to specific parts remain the same throughout the different FIGS. Referring first to FIG. 1, the foldable mounting bracket assembly, the invention, can support a vertical cylindrical disposed support member that is used in conjunction with various vertically disposed deck and patio accessories as indicated by numerical reference 10 and various horizontally supported accessories as indicated by numerical reference 17. In FIG. 1, FIG. 2, FIG. 3, FIG. 14 FIG. 15, and FIG. 16 the support floor is numerical reference 11, the deck or patio vertical railing support post is numerical reference 12, the top railing cap is numerical reference 13, and the railing horizontal support members are numerical references 14, and 15. Referring to FIG. 1, FIG. 14, and FIG. 17, numerical reference 16a depicts the upper and lower foldable mounting brackets assembly in the deployed position. In FIG. 1, and FIG. 10, the vertically disposed deck or patio accessory support member is numerical reference 10, and in FIG. 1, FIG. 14, FIG. 15, FIG. 16, FIG. 14, and FIG. 17 the horizontally supported accessory is numerical reference 17. In FIG. 2, FIG. 3, FIG. 16, and FIG. 17 the foldable mounting bracket assembly in the closed position is shown as numerical reference 16b, and in FIG. 3 and FIG. 14 the foldable mounting bracket assembly rotating axis is numerical reference 20. In FIG. 4, the foldable mounting bracket assembly base portion is numerical reference 23, the circular apertures for fastening the base portion to the vertical deck railing support post is numerical reference 24, and the horizontal bore for inserting the knuckle or pivot pin is numerical reference 32. The base portion has a front side numerical reference 25, a right side numerical reference 27, an upper side numerical reference 29, with a radius, numerical reference 33, which interfaces the top, numerical reference 29, to the front side. Numerical reference 31 is the double eye section of a knuckle joint. In FIG. 5, the foldable mounting bracket assembly base portion has a back side numerical reference 26, a left side numerical reference 28, and an under side numerical reference 30. In FIG. 6, the rotating mounting head is numerical reference 34; the cylindrical aperture for mounting the vertically and horizontally disposed accessory is numerical reference 43. The rotating mounting head has a front side numerical reference 35, a right side numerical reference 37 and an underside numerical reference 41. In FIG. 7, the rotating mounting head has a back side numerical reference 36, a left side numerical reference 38 and numerical reference 39 is the top side. In FIG. 6 and FIG. 7, numerical reference 44 is the single eye of the knuckle joint which has a horizontal bore, numerical reference 42, and a continuous radius, numerical reference 45, at the underside connecting the front side numerical reference 35 to a back side numerical reference 36. FIG. 8 illustrates the assembly of the base portion, numerical reference 23, to the rotating mounting head, numerical reference 34, utilizing the knuckle or pivot pin, numerical reference 40 which provides the rotation of the foldable mounting bracket assembly. In FIG. 9 and FIG. 10, numerical reference 20 is the rotating axis that opens the foldable mounting bracket assembly from the closed position, numerical reference 16b in FIG. 9, to the deployed or open position, numerical reference 16a in FIG. 10. In FIG. 11 and FIG. 12, the depiction of the semi cylindrical tapered wedge is numerical reference 22. In FIG. 13, the foldable mounting bracket assembly in the deployed position is numerical reference 16a, supporting a vertically disposed cylindrical accessory post utilizing the semi cylindrical tapered wedge, numerical reference 22, compensating for the various diameters of the vertically disposed accessory support posts. In FIG. 2, the foldable mounting bracket assembly is mounted to the vertically disposed support post. In this configuration, the foldable mounting bracket assembly is closed and the foldable mounting bracket assembly, FIG. 9, is parallel to the support post. In FIG. 3, the foldable mounting bracket assembly is mounted to the vertically disposed support post. In this configuration, the foldable mounting bracket assembly, FIG. 10, is deployed and the base portion is parallel to a vertically disposed support post. The rotating mounting head is perpendicular to the base portion and the vertically disposed support post as well as parallel to the deck or the ground. In FIG. 4, numerical reference 23 is the base portion of the foldable mounting bracket assembly and numerical reference 24 depicts the circular apertures for fastening the base portion to the vertical deck railing support post. The mounting of the foldable mounting bracket assembly to the vertical deck railing support post is accomplished through the use of a variety of fasteners. In FIG. 14, FIG. 15, and FIG. 16, numerical reference 17, has a support structure, numerical reference 46, and a circular aperture, numerical reference 47. In FIG. 14, numerical reference 17, the table, is in the process of being installed on numerical reference 16a. Numerical reference 18 is the securing pin which will be utilized to secure numerical reference 17, the table, to the foldable mounting bracket assembly, numerical reference 16a. In FIG. 15 the horizontally disposed accessory, numerical reference 17, the table, is in the deployed position and secured to the foldable mounting bracket with numerical reference 18, a securing pin. In FIG. 16 the horizontally disposed accessory, numerical reference 17, the table, is attached in a permanent configuration and is in the stowed position which is parallel to the vertical support post, numerical reference 12. In this configuration the top foldable mounting bracket assembly, numerical reference 16b is attached to the vertical support post with the rotating mounting head folding downward toward the lower railing when the foldable mounting bracket assembly is in its stowed position.

As another alternative, the horizontally disposed accessory, a table, can be permanently attached to the foldable mounting bracket assembly and deployed from the stow position as depicted in FIG. 16 and FIG. 17 to the operational position as depicted FIG. 1. In this configuration, the table has a pivoting axis on the side walls of the tables support frame, numerical reference 46. This pivoting axis would be on the center line of the circular aperture. The horizontally disposed accessory, the table, is secured with numerical reference 18, securing pin, or a vertically disposed accessory as depicted by numerical reference 10 in FIGS. 1 and 13. This pivoting axis would intersect the table support frame and the base portion of the foldable mounting bracket assembly so that when the table is in the deployed position the circular apertures of the foldable mounting bracket assembly, numerical reference 43, and the table, numerical reference 47, align. The horizontally disposed accessory, the table, is secured with numerical reference 18, securing pin, as depicted in FIG. 13 or a vertically disposed accessory as depicted by numerical reference 10 in FIG. 1.

What is claimed:

1. A foldable mounting bracket assembly for mounting a deck or patio accessory, said foldable mounting bracket assembly comprising:
   a) a base portion for fastening said foldable mounting bracket assembly to a deck railing vertical support post, wherein said base portion comprises a double eye section of a knuckle joint having a horizontal bore through said double eye section for receiving a horizontally mounted pivot pin that attaches said base portion to a rotating mounting head;
   b) wherein said rotating mounting head has a circular aperture for mounting said deck or patio accessory, wherein said rotating mounting head comprises a single eye section of said knuckle joint having a horizontal bore through said single eye section for receiving said horizontally mounted pivot pin that attaches said rotating mounting head to said base portion;
   c) wherein said horizontally mounted pivot pin facilitates a 90° rotation from a closed position, wherein said rotating mounting head is parallel to said deck railing vertical support post, to a deployed position, wherein said rotating mounting head is perpendicular to said deck railing vertical support post, and parallel to a deck floor surface;
   d) wherein said base portion further comprises two circular apertures for receiving fasteners for attaching said foldable mounting bracket assembly to said deck railing vertical support post; and
   e) wherein said base portion further comprises a front side and a back side, wherein, when installed and in said closed position, said front side and said back side are parallel to said deck railing vertical support post, wherein said foldable mounting bracket assembly further comprises a semi cylindrical tapered wedge, which stabilizes and secures said vertically disposed deck or patio accessory when installed with said foldable mounting bracket assembly;
   f) wherein said deck or patio accessory comprises a table, wherein said table has a top side and a bottom side, parallel to said top side; said table further comprising a mounting side, which has a rectangular cavity that is complementary to the size and shape of said rotating mounting head for installation of said table to said foldable mounting bracket assembly; said table further comprises a circular aperture that is complementary to said circular aperture in said rotating mounting head of said foldable mounting bracket assembly; wherein when said table is used with a vertically disposed deck and patio accessory, said table can be leveled and stabilized through the use of said semi cylindrical wedge.

2. A foldable mounting bracket assembly as in claim 1, wherein said foldable mounting bracket assembly secures the table through the use of a securing pin.

* * * * *